(No Model.)
W. L. SILVEY.
SECONDARY BATTERY.
No. 500,622. Patented July 4, 1893.
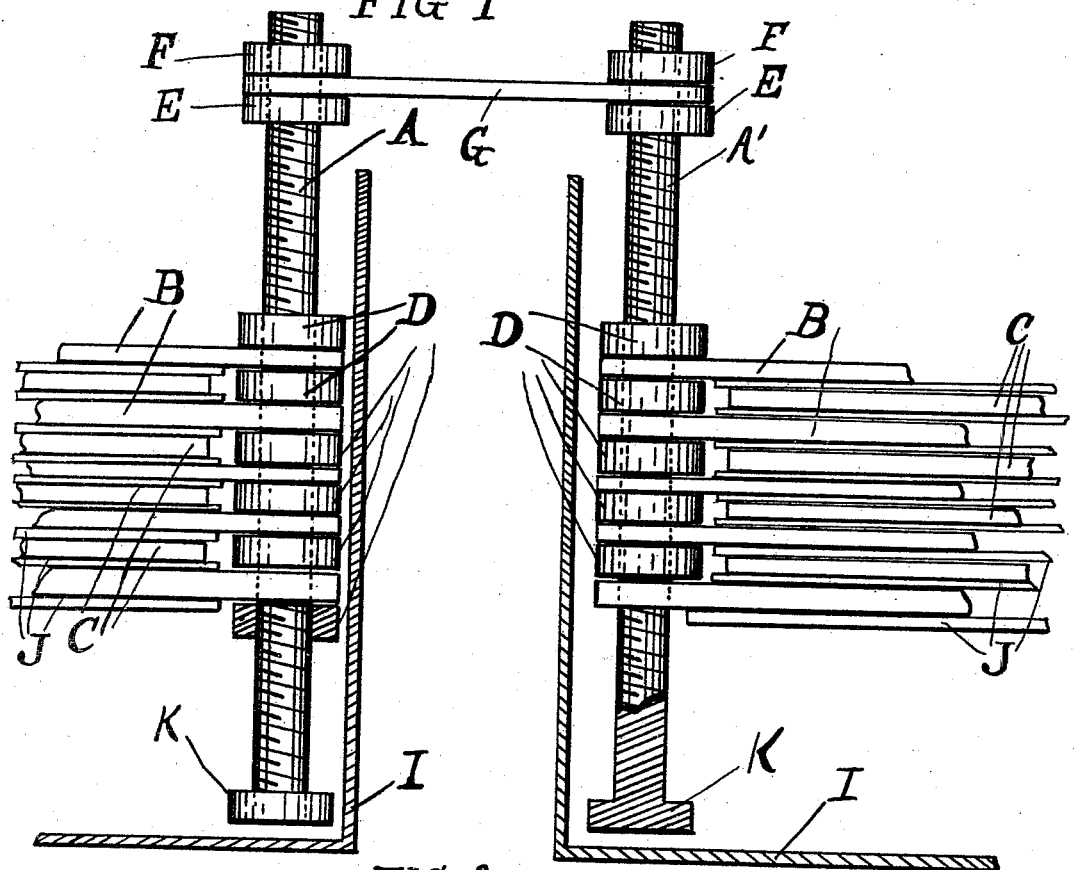
WITNESSES
E. B. Sehman,
C. U. Raymond
INVENTOR
William L. Silvey

UNITED STATES PATENT OFFICE.

WILLIAM L. SILVEY, OF LIMA, OHIO.

SECONDARY BATTERY.

SPECIFICATION forming part of Letters Patent No. 500,622, dated July 4, 1893.

Application filed July 9, 1892. Serial No. 439,496. (No model.)

*To all whom it may concern:*

Be it known that I, WILLIAM L. SILVEY, a resident of Lima, in the county of Allen and State of Ohio, have invented certain new and useful Improvements in Secondary Batteries, of which the following is a specification.

My invention relates to a secondary battery whose electrodes are made separable and arranged for the purpose of producing great solidity of the parts, and a means for connecting one electrode of a positive or negative polarity of one element to the positive or negative electrode of another element.

Referring to the accompanying drawings which are made a part hereof in which similar letters of reference indicate similar parts, Figure 1, is a side elevation partly in section of parts of two battery cells electrically coupled together. Fig. 2 is a plan view of the coupling G of which Fig. 1 shows a side elevation. The battery electrodes of each cell are similar in construction. Hence a description of one will answer the purpose for all.

In constructing this battery I first cast a screw of lead, A, A' which is alloyed with antimony or some other suitable metal for the purpose of stiffening the rod and taking away the tenacious stringy qualities of a pure lead battery screw. The nuts D, and the battery plates B C are also made of lead which may be more or less alloyed with a similar hardening material, if found desirable for the purposes of giving it tenacity or inoxidizable qualities, but I prefer to make only the nuts very hard. In fact the nuts require to be as hard if not considerably harder than the screw rods, as it makes the thread on the nuts hold more even. The battery plates may be of the grid or Planté formation if desired, but this does not in any way depart from my invention; neither does the alloying of the metals of which the lead is a base.

The side rods or battery screws A, A' consist of a screw rod from eight to fifteen inches long, and from one fourth to one inch in diameter, cast in a suitable mold, while the battery nuts or collars are also cast with a screw thread on their inner side whereby they become a nut. It will be observed that the side screws have an enlargement or head on their lower end, for confining the lower battery plate in position. The positive and negative plates are arranged alternately between each other as shown in Fig. 1, in which B represents the negative plate and C represents the positive plate.

The positive and negative plates are disposed horizontally as shown, and between each plate is a separate sheet of a porous separating medium placed there for keeping the battery plates separated, and as an absorbent for the liquid. This separating medium is a material which has been thoroughly ground and treated with acids until all the fibrous structure has been reduced. It is now thoroughly washed and passed to a fulling machine and reduced to a sheet of the proper thickness and thoroughly dried until all moisture is expelled. It is now taken and cut into suitable shape and placed in the battery. During the treating process the separating material is reduced to a state where it will not become carbonized in an electrolytic solution so that it can be depended upon for a long service.

The battery plates are not connected together by the flat plates or sheets which constitute the battery plates B C, being clamped first to the connecting rods A, A' by means of the nuts D, the battery plate being pushed down on the rods against the metal head K, then a nut, then a plate and so on until the element is completed, the plates being alternately positive and negative with a sheet of the separating porous material between each plate. The batteries usually consist of eleven negative and ten positive plates, and having been completed are now assembled and connected together by the device G shown in Figs. 1 and 2. It will be observed to consist of a flat sheet of lead or some other equally indestructible metal having a hole H at each end through which the connecting rods A A pass and to which they are clamped by the nuts and collars E, E'. These collars serve the double purpose of a clamp and nut. Heretofore copper wire has been almost universally used as battery connectors it being in almost all cases covered by some rubber compound for a protection against the attacks of the battery solution, but in my device no such protection is required. All that is necessary is to clamp the connector firmly to the battery rod by the nuts and it can be depended upon so long as the clamp is made secure; besides, the clamp is very easily made, and it being cast in a mold is very cheap, whereas all battery connectors heretofore made, so far as I am aware have been expensive, and being made of brass or copper are very liable to become eaten by the electrolyte.

Having described my invention, what I claim as new, and wish to secure by Letters Patent in the United States, is fully embodied in the following claims:

1. In a secondary battery the combination of a vertically placed rod, having a screw thread thereon the rod passing through horizontally placed battery plates to which they are clamped by means of nuts, and a connecting device at the upper end of the rod consisting of a strip of lead or lead alloy the rod passing through the strip to which it is clamped by means of adjustable nuts traversing the rod and pressing against the strip on both its upper and lower sides.

2. In a secondary battery the positive and negative battery plates respectively arranged alternately each plate separated from the one next adjoining it by a sheet of a porous separating medium, the positive and negative plates respectively clamped together by a series of metal nuts in combination with screw threaded battery rods having an enlargement on their lower ends and connectors for connecting the cells together, consisting of a strip of lead or lead alloy having a hole in each end the battery rod passing through the hole and adjustable nuts bearing against both the lower and upper faces of the strips as set forth.

3. In a secondary battery the combination of horizontally placed battery plates, having an interposed pervious separating medium with a cast screw rod of an alloyed metal, having lead as a base, the rod passing through the battery plates, the upper end of the rod having a connecting strip for connecting two or more cells together, the strip being clamped to the rod by means of adjustable nuts.

4. In a secondary battery a connecting device therefor, consisting of a cast metal screw of lead, the rod passing through battery plates, and having an integral head on one end the other end of the rod having a connecting strip of metal to which it is clamped by metal nuts.

In testimony whereof I have set my hand this 6th day of July, 1892.

WILLIAM L. SILVEY.

Witnesses:
C. U. RAYMOND,
ED. L. SPENCER.